Nov. 6, 1923.　　　　　E. A. TUCKER　　　　　1,472,949
EARTH DRAG
Filed May 10, 1922
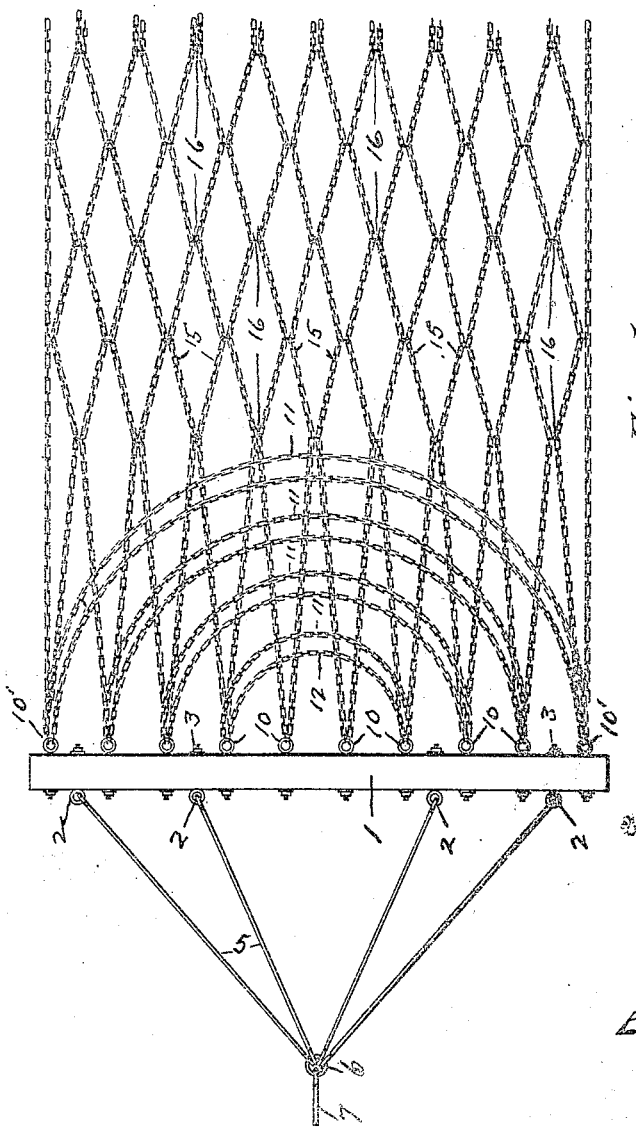
INVENTOR
Elmer A. Tucker
BY
Frank Warren
ATTORNEY Patented Nov. 6, 1923.

1,472,949

UNITED STATES PATENT OFFICE.

ELMER A. TUCKER, OF BREMERTON, WASHINGTON.

EARTH DRAG.

Application filed May 10, 1922. Serial No. 559,947.

*To all whom it may concern:*

Be it known that I, ELMER A. TUCKER, a citizen of the United States, residing at Bremerton, in the county of Kitsap and State of Washington, have invented a certain new and useful Improvement in Earth Drags, of which the following is a specification.

My invention relates to improvements in earth drags and the object of my invention is to provide a drag that is adapted for levelling and spreading earth over road beds when the same have become worn and full of ruts.

Another object is to provide an earth drag that embodies flexible means joined in such a manner that when drawn over uneven ground said means will have a tendency to spread apart the ground and causing the means to ride over the raised portions of the ground thereby converging, spreading and levelling the same.

A still further object is to provide an improved drag or flexible construction that will follow the movements of the actuating tractor or team of horses and having means extending rearwardly in relatively straight spaced relation so that short corners may be turned without the flexible depending means overrunning each other and failing to reach portions of ground to be covered.

It is within the province of the disclsure to improve generally and to increase the utility of devices of the type to which the present invention pertains.

With the above and other objects in view which will appear as the description proceeds, my invention resides in the combination and arrangement of parts and in the details of construction hereinafter described and claimed it being understood that within the scope of what is claimed changes in the precise embodiment of my invention shown can be made without departing from the spirit thereof.

I accomplish these objects by devices illustrated in the accompanying drawings, wherein—

Figure 1 is a plan view of an apparatus embodying my invention; and

Fig. 2 is a view in side elevation of the same.

Referring to the drawings, throughout which like reference numerals indicate like parts, the numeral 1 designates a beam preferably of wood, and of rectangular cross-section, eye-bolts 2 are positioned at spaced intervals along the forward face of said beam, the shank of said eye-bolts being extended through the beam and secured at the rear thereof by nuts 3. Cables or other flexible lines 5 are attached to said eye-bolts 2 and are gathered together in a ring 6 from which a line 7 may lead to the shaft gear of a team of horses or to a tractor, not shown, whereby the device is operatively actuated.

Eye-bolts 10 extending from the rear face of the beam 1 oppositely to the eye-bolts 2 and secured in a corresponding manner are spaced apart at relatively close regular intervals. One or more lengths or loops of chain 11 are festooned between the outermost of said eye-bolts, as at 10', at each end of the beam 1, so that said loops will make, when arranged symmetrically, approximately a half circle. Similarly, additional loops of chain are arranged in festoons 12 within the half circle 11 and attached at their ends to inner pairs of eye-bolts 10 positioned symmetrically on opposite sides of the transverse axis of said beam. Said festooned loops of chain are disposed and arranged to drag the ground and will engage the earth encountered in heaps or uneven condition and convey, level and smooth the same in an efficient manner.

Chains 15 are connected at one end to the said eye-bolts 10 and 10' and extend rearwardly from the beam over the festooned loops 11 and 12. The superposed weight of the chains 15 on said loops renders the loops more efficient to engage the earth and spread the same. Said chains 15 are connected together by links 16 at spaced intervals along their lengths rearwardly of said outermost loop 11 and in staggered relation so that the chains will follow a zig-zag course and enclose spaces of conventional diamond shape which have the capacity to open and close with great flexibility and responsiveness to the configuration of the ground. Said spaces will be expanded laterally in going over hillocks and the chains will be stretched laterally to expose a larger area and offer more resistance to the earth in the direction in which they are travelling so that the earth will be carried thereby and be deposited or spread along the lower levels when the spaces shall contract and the chains lie in normal lines.

It is also found that the diagonal lines on which the chains 15 are connected serve to transmit the draft forces along the lengths of the chains so that they will follow rearwardly in relatively straight lines even when the drag describes a devious course or in turning a corner.

It will be seen that the improved drag when made in accordance with the description herein set forth can be made of simple and easily procurable materials and may be readily and economically constructed. It is very efficient in spreading and smoothing ground and is particularly adapted for use with tractors or to follow gang-plows and the like, as it requires the minimum of attention and is not liable to be clogged by collecting roots and other débris from which ordinarily harrows and drags must be continually freed.

What I claim is:

1. An earth drag, consisting of a transverse beam, a plurality of chains festooned rearwardly from said beam, and a plurality of chains superposed upon said chain festoons and extending rearwardly from said beam.

2. An earth drag, consisting of a transverse beam, a plurality of chains festooned rearwardly from said beam in substantially concentric half circles, a plurality of chains extending rearwardly from said beam in straight lines, and links connecting said chains in zig-zag lines.

3. An earth drag, consisting of a transverse beam, a plurality of chains festooned rearwardly from said beam, a plurality of chains extending rearwardly from said beam, and links connecting said chains in a conventional diamond configuration.

In witness whereof, I hereunto subscribe my name this 12th day of April A. D. 1922.

ELMER A. TUCKER.